(12) United States Patent
Chechani et al.

(10) Patent No.: US 10,326,737 B2
(45) Date of Patent: *Jun. 18, 2019

(54) MOBILE HOTSPOT MANAGED BY ACCESS CONTROLLER

(71) Applicant: Fortinet, Inc., Sunnyvale, CA (US)

(72) Inventors: Pankajkumar Chechani, Sunnyvale, CA (US); Sekhar Sumanth Gorajala Chandra, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/640,378

(22) Filed: Jun. 30, 2017

(65) Prior Publication Data

US 2017/0310640 A1    Oct. 26, 2017

Related U.S. Application Data

(63) Continuation of application No. 14/712,549, filed on May 14, 2015, now Pat. No. 9,699,144, which is a
(Continued)

(51) Int. Cl.
*G06F 15/16* (2006.01)
*H04L 29/06* (2006.01)
(Continued)

(52) U.S. Cl.
CPC ........ *H04L 63/029* (2013.01); *H04L 63/0272* (2013.01); *H04L 63/0892* (2013.01);
(Continued)

(58) Field of Classification Search
CPC ........ H04W 12/08; H04W 88/06; H04L 63/20
See application file for complete search history.

(56) References Cited

U.S. PATENT DOCUMENTS

| 7,239,632 B2 | 7/2007 | Kalavade et al. |
| 8,411,604 B2 * | 4/2013 | Reif ...................... H04W 48/18 370/310 |

(Continued)

OTHER PUBLICATIONS

Non-Final Rejection for U.S. Appl. No. 14/498,504 dated Feb. 4, 2015.
(Continued)

*Primary Examiner* — Bryan Lee
(74) *Attorney, Agent, or Firm* — Jaffery Watson Mendonsa & Hamilton LLP

(57) ABSTRACT

Systems and methods are described for a mobile hotspot that can be managed by an access controller. According to an embodiment, a WAN connection is established by a mobile hotspot through a telecommunication data network via a wireless WAN module. When in a first mode, the mobile hotspot: (i) sets up a secure tunnel through the WAN connection with an AC of the enterprise that manages APs of a wireless network of an enterprise; (ii) broadcasts an SSID that is also broadcast by the APs; (iii) establishes a WLAN connection with a WiFi-enabled device based on an AP profile containing (a) authentication information regarding users approved to access the wireless network and (b) information identifying the SSID; (iv) receives WLAN traffic from the WiFi-enabled device through the WLAN connection; and (v) transmits the WLAN traffic to a server of the enterprise via the secure tunnel and the AC.

16 Claims, 9 Drawing Sheets

Related U.S. Application Data continuation of application No. 14/498,504, filed on Sep. 26, 2014, now Pat. No. 9,078,137.

(51) Int. Cl.

| | | |
|---|---|---|
| *H04W 12/08* | (2009.01) | |
| *H04W 76/12* | (2018.01) | |
| *H04W 76/11* | (2018.01) | |
| *H04W 76/15* | (2018.01) | |
| *H04W 84/12* | (2009.01) | |
| *H04W 76/14* | (2018.01) | |
| *H04W 88/08* | (2009.01) | |

(52) U.S. Cl.
CPC ........... *H04L 63/102* (2013.01); *H04W 12/08* (2013.01); *H04W 76/11* (2018.02); *H04W 76/12* (2018.02); *H04W 76/14* (2018.02); *H04W 76/15* (2018.02); *H04W 84/12* (2013.01); *H04W 88/08* (2013.01)

(56) References Cited

U.S. PATENT DOCUMENTS

| | | |
|---|---|---|
| 9,078,137 B1 | 7/2015 | Chechani et al. |
| 9,699,144 B2 | 7/2017 | Chechani et al. |
| 9,985,931 B2 | 5/2018 | Chechani et al. |
| 10,015,142 B2 | 7/2018 | Chechani et al. |
| 2006/0094400 A1 | 5/2006 | Beachem et al. |
| 2007/0073868 A1 | 3/2007 | Nelson et al. |
| 2007/0082671 A1 | 4/2007 | Feng et al. |
| 2008/0120414 A1 | 5/2008 | Kushlnagar et al. |
| 2013/0007853 A1 | 1/2013 | Gupta et al. |
| 2013/0120596 A1* | 5/2013 | Yau .................. H04N 5/23206 348/207.11 |
| 2014/0348152 A1* | 11/2014 | Vanderhulst ............ H04W 4/00 370/338 |
| 2016/0094515 A1 | 3/2016 | Chechani et al. |
| 2016/0095153 A1 | 3/2016 | Chechani et al. |
| 2017/0163601 A1 | 6/2017 | Chechani et al. |

OTHER PUBLICATIONS

Notice of Allowance for U.S. Appl. No. 14/498,504 dated May 28, 2015.
Non-Final Rejection for U.S. Appl. No. 14/669,682 dated Nov. 14, 2016.
Notice of Allowance for U.S. Appl. No. 14/712,549 dated Mar. 1, 2017.
Notice of Allowance for U.S. Appl. No. 14/669,682 dated Aug. 11, 2017 and Aug. 29, 2017.
Final Rejection for U.S. Appl. No. 14/669,682 dated Mar. 21, 2017.
Notice of Allowance for U.S. Appl. No. 15/436,802 dated Feb. 14, 2018.
Notice of Allowance for U.S. Appl. No. 14/669,682 dated Aug. 29, 2017.

* cited by examiner

MOBILE HOTSPOT MANAGED BY ACCESS CONTROLLER

CROSS-REFERENCE TO RELATED PATENTS

This application is a continuation of U.S. patent application Ser. No. 14/712,549, filed on May 14, 2015, which is a continuation of U.S. patent application Ser. No. 14/498,504, filed on Sep. 26, 2014, now U.S. Pat. No. 9,078,137, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2017, Fortinet, Inc.

BACKGROUND

Field

Embodiments of the present invention generally relate to the field of wireless networking. In particular, various embodiments relate to a mobile hotspot that is managed by an access controller.

Description of the Related Art

Wireless access points (APs) are deployed to cover public areas, offices and residences so that wireless fidelity (WiFi)-enabled devices may be connected to a private network or the Internet through a wireless network. When a large number of APs are deployed in an enterprise network, the wireless APs are connected to a wireless access controller (AC) and are managed by the AC. The APs may retrieve the same AP profile from the AC and use the same AP profile in managing the wireless connectivity so that a WiFi client may roam between the APs and have secure network access within the enterprise network. When users are out of the area covered by the enterprise network, a virtual private network (VPN) connection between a client device and the enterprise network may be established across the Internet so that the client device may access the network in a secure way. Along with the rapid development of telecommunication technology, data transmission speeds through telecommunication data networks, such as 3G/4G cellular networks, is increasing. Most wireless operators offer mobile hotspots to their subscribers so that WiFi-enabled devices may connect to the Internet through the telecommunication network. A mobile hotspot is a router with a wireless wide area network (WWAN) and a wireless local area network (WLAN) sharing function to allow multiple WiFi stations including smart phones, notebook computers and tablet PCs to access to the WWAN simultaneously. Some smart phones also provide personal hotspot functions which turn a smart phone into a mobile hotspot and allow other WiFi-enabled devices to share the Internet connection of the smart phone. Each mobile hotspot comprises an AP profile which is a set of parameters used for establishing connections between WiFi stations and the hotspot. An AP profile typically includes connection-related information including, for example, service set identification (SSID), security, authentication, encryption, SSID broadcasted, etc.

At present, in order to establish a secure connection between a client device and an enterprise network through a mobile hotspot, the client device needs to connect to the mobile hotspot based on the AP profile. After the client device connects to the Internet through the mobile hotspot, a VPN application may be started on the client device to establish a VPN connection to the enterprise network through the Internet. Usually, a VPN server may require the VPN application to provide user authentication before the VPN connection is established. If multiple client devices need to connect to the enterprise network through the same mobile hotspot, each of the client devices needs to separately establish its own VPN connection to the enterprise network. Currently, AP profiles of APs of an enterprise network are managed by the AC and the AP profile of a mobile hotspot is managed by the service provider or the subscriber. When a client device needs to use both APs of the enterprise network and the mobile hotspot to connect to the enterprise network, the client device must use different AP profiles to establish WiFi connections. It is not convenient for the user to switch between WiFi networks. It is also currently impossible to seamlessly roam between enterprise network APs and a mobile hotspot.

Therefore, there is a need for a mobile hotspot that may be managed by an AC so that WiFi-enabled devices can connect to the mobile hotspot as well as an enterprise network easily.

SUMMARY

Systems and methods are described for a mobile hotspot that can be managed by an access controller. According to an embodiment, a wide area network (WAN) connection is established by a mobile hotspot, located outside of range of access points (APs) of a wireless network of an enterprise, through a telecommunication data network via a wireless WAN module of the mobile hotspot. When the mobile hotspot is in a first mode: (i) a secure tunnel is setup through the WAN connection with an access controller (AC) of the enterprise that manages the APs; (ii) a first service set identifier (SSID) is broadcast by the mobile hotspot that is also broadcast within premises of the enterprise by the APs; (iii) a wireless local area network (WLAN) connection is established by the mobile hotspot with a Wireless Fidelity (WiFi)-enabled device based on an enterprise AP profile containing (a) authentication information for authenticating one or more WiFi users that are approved to access the wireless network and (b) information identifying the first SSID; (iv) WLAN traffic from the WiFi-enabled device is received by the mobile hotspot through the WLAN connection; and (v) the WLAN traffic is transmitted to a server of the enterprise via the secure tunnel and the AC.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
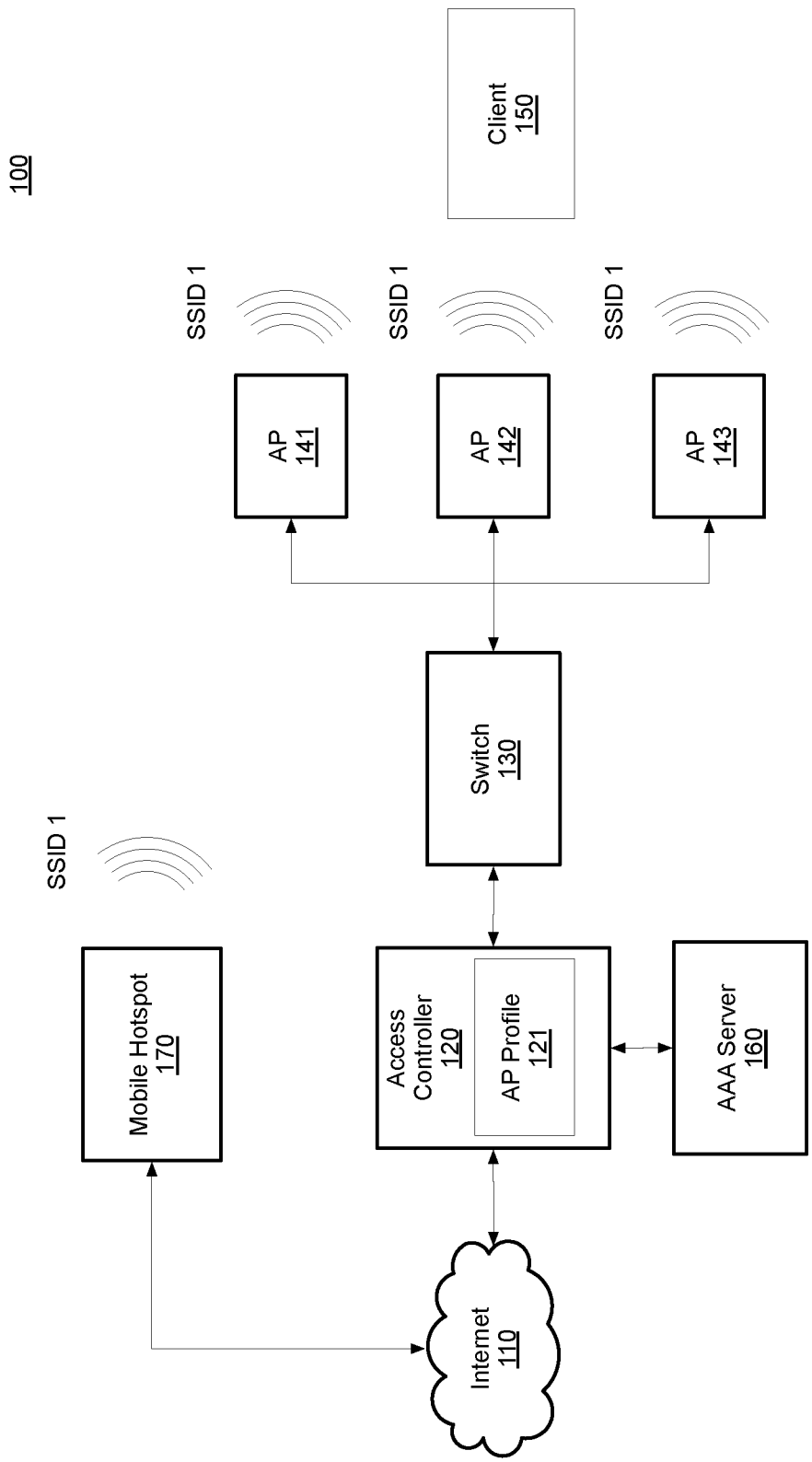
FIG. 1 illustrates an exemplary network architecture when a WiFi-enabled device accesses a private network through internal APs in accordance with an embodiment of the present invention.

Systems and methods are described for a mobile hotspot that can be managed by an access controller. According to an embodiment, a mobile hotspot establishes a wide area network (WAN) connection through a wireless WAN module and establishes a wireless local area network (WLAN) connection with a WiFi-enabled device using a first AP profile, wherein the first AP profile is the same as an AP profile for APs that are controlled by an access controller (AC). The mobile hotspot sets up a security tunnel with the AC through the WAN connection. After receiving WLAN traffic from the WiFi-enabled device through the WLAN connection, the mobile hotspot routes the WLAN traffic to the AC through the security tunnel.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "mobile hotspot" generally refers to a hardware device that provides wireless Internet access via a mobile broadband service (e.g., third generation mobile telecommunications technology (3G) meeting the International Telecommunications Union's (ITU's) International Mobile Telecommunications for the year 2000 (IMT-2000) technical standards, including, but not limited to, Universal Mobile Telecommunications System (UTMS), Wideband Code Division Multiple Access (W-CDMA), Time Division Synchronous Code Division Multiple Access (TD-SCDMA), Enhanced Data GSM Environment (EDGE), High Speed Packet Access (HSPA), HSPA+, CDMA2000, or fourth generation mobile telecommunications technology (4G), including, but not limited to, mobile WiMAX and Long Term Evolution (LTE)) available from mobile service and/or cellular providers by creating an accessible wireless network that can be accessed by multiple mobile devices.

The phrase "security device" generally refers to a hardware device or network appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. Load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORITDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network architecture when a WiFi-enabled device 150 accesses a private network 100 through internal APs 141-143 in accordance with an embodiment of the present invention. In the present example, network 100 includes a wireless access controller (AC) 120 that is connected to a WAN, such as the Internet 110. AC 120 may also be a cloud-based AC that connects and manages APs of an enterprise network from cloud. Multiple APs, such as wireless AP 141-143, may be connected to AC 120 directly or through a switch 130. A Wi-Fi-enabled client 150 may connect to any wireless AP (141-143) when within coverage of the APs. In the present example, APs 141-143 may be thin APs that have wireless AP functions only at the APs side while the management functions are handled by AC 120. When APs 141-143 are connected to network 100, management channels, such as Control And Provisioning of Wireless Access Points (CAPWAP) command tunnels, are established between APs 141-143 and AC 120. AC 120 may distribute operating system images, configuration settings and/or AP profiles, such as AP profile 121, to APs (141-143). AC 120 may also manage the traffic transferred from/to APs 141-143 based on security policies. AP profile 121 may include service set identification (SSID), security and authentication that will be used by the APs to establish wireless LAN connections. For example, all APs 141-143 accept the same AP profile 121 from AC 120 and broadcast the same SSID (i.e., SSID 1) and authenticate WiFi client 150 by an authentication, authorization, and accounting (AAA) server 160 according to authentication protocols, such as 802.11 1x. These authentication protocols include, but are not limited to 801.1x, Extensible Authentication Protocol (EAP), and Cisco's® Wireless authentication protocol LEAP. As APs (141-143) utilize the same AP profile to establish a WiFi connection with client 150, client 150 may roam between and among APs (141-143). In order to support fast roaming between APs, pre-authentication and pairwise master key (PMK) caching may be utilized by APs 141-143. These protocols and mechanism are well known in the art and hence further description thereof will be omitted for brevity. In the example, a mobile hotspot 170 also connects to AC 120 through a telecommunication data network (not shown) and the Internet 110. The functions of mobile hotspot 170 will be described in detail below with reference to FIG. 2.

Figure 2:
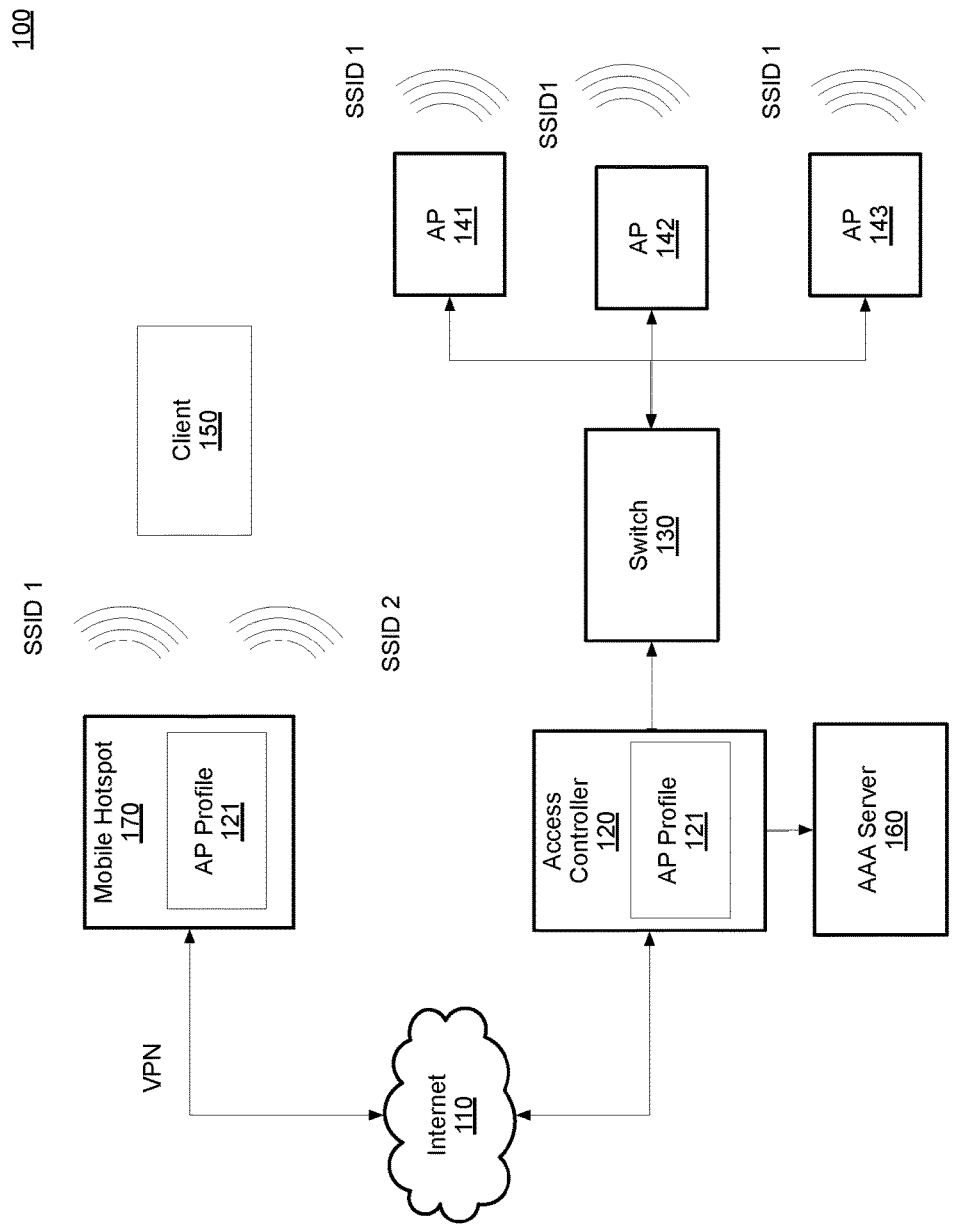
FIG. 2 illustrates an exemplary network architecture when a WiFi-enabled device accesses a private network through a mobile hotspot in accordance with an embodiment of the present invention.

FIG. 2 illustrates an exemplary network architecture when a WiFi-enabled device 150 accesses a private network 100 through a mobile hotspot 170 in accordance with an embodiment of the present invention. In this example, mobile hotspot 170 connects to AC 120 through a backhaul wireless network (not shown) and the Internet 110. Mobile hotspot 170 may be registered to AC 120 during a configuration or an initialization procedure. During registration, AC 120 may register necessary information of mobile hotspot 170, including, but not limited to, a media access control (MAC) address and a serial number of mobile hotspot 170. The parameters that are needed for the mobile hotspot 170 to connect to AC 120 may also be set up at mobile hotspot 170. These parameters include the Internet Protocol (IP) address of AC 120 and other CAPWAP parameters that are used for setting up a CAPWAP tunnel between mobile hotspot 170 and AC 120. When mobile hotspot 170 connects to the Internet 110 through its WWAN module (not shown), an AP management module (not shown) of mobile hotspot 170 may automatically send a request to AC 120. As mobile hotspot 170 is registered with AC 120, the request will be accepted by AC 120 and a secure tunnel connection, such as a CAPWAP tunnel, is established using the parameters that are set up during the registration procedure. After the CAPWAP tunnel is established, the AP management module of mobile hotspot 170 may retrieve an AP profile, such as AP profile 121 from AC 120. It will be apparent to those skilled in the art that AP profile 121 may also be retrieved by mobile hotspot 170 during the registration procedure. AP profile 121 retrieved from AC 120 may be the same as that used by APs 141-143 within the enterprise network 100. Mobile hotspot 170 may broadcast SSID 1 included in AP profile 121. When client 150 leaves the coverage area of APs 141-142 and enters the coverage area of mobile hotspot 170, client 150 probes SSID 1 broadcasted by mobile hotspot 170 and establishes a wireless LAN connection with mobile hotspot 170 using AP profile 121. As a secure tunnel between mobile hotspot 170 and AC 120 has been established, client 150 does not need to run a VPN application to set up a VPN connection with the enterprise network. For WiFi client 150 accessing the enterprise network, connecting to mobile hotspot 170 when it leaves enterprise network 100 is the same as connecting to APs 141-143 when within enterprise network 100.

In some examples, the AP management module of mobile hotspot 170 may route WiFi traffic from all WiFi-enabled devices connected to mobile hotspot 170 through the secure tunnel connection so that the secure tunnel connection between mobile hotspot 170 and AC 120 may be shared by all such WiFi-enabled devices. In this manner, the WiFi-enabled devices connected to mobile hotspot 170 may be provided with secure access to enterprise network 100 without a VPN application running on each of the devices.

In some other examples, multiple SSIDs and multiple authentication mechanisms are defined in an AP profile. In such cases, mobile hotspot 170 may broadcast multiple SSIDs simultaneously and the different security policies may be deployed to users connected through different SSIDs. For example, AP profile 121 that is pushed from AC 120 to mobile hotspot 170 may includes SSID 1, SSID 2 and corresponding authentication mechanisms for establishing the wireless LAN connections. Mobile hotspot 170 may broadcast SSID 1 and SSID 2 simultaneously. WiFi clients connecting to mobile hotspot 170 through different SSIDs may enforce different security policies. For example, WiFi traffic from a WiFi client connecting to SSID 2 may be sent through the Internet connection of mobile hotspot 170 directly without going through a VPN connection to AC 120.

Figure 3:
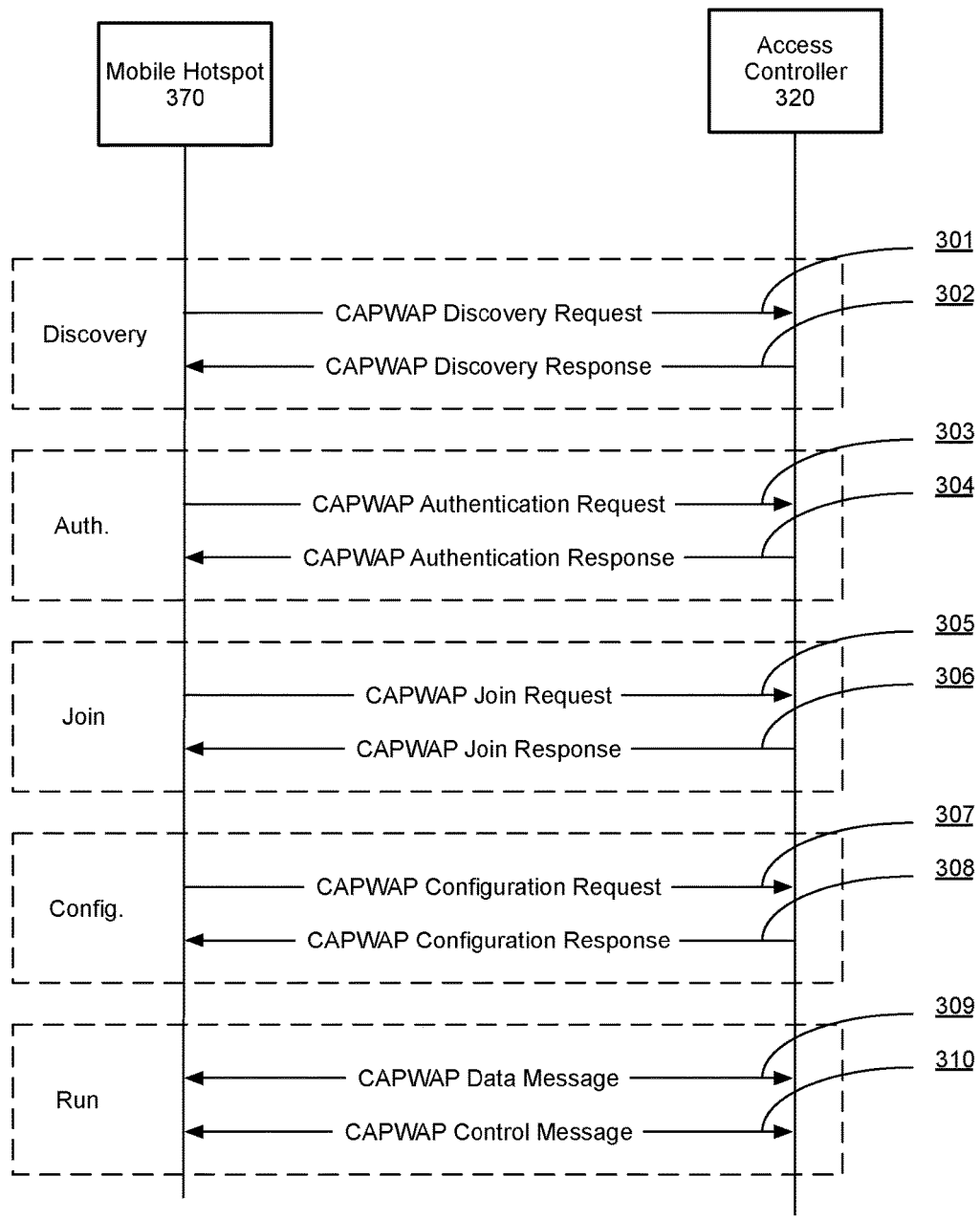
FIG. 3 is a sequence chart illustrating interactions between a mobile hotspot and an access controller in accordance with an embodiment of the present invention.

FIG. 3 is a sequence chart illustrating the interactions between a mobile hotspot 370 and an access controller 320 in accordance with an embodiment of the present invention. During discovery, a Wi-Fi management module (not shown) within mobile hotspot 370 initiates a CAPWAP discovery request to AC 320 after mobile hotspot 370 is connected to the Internet through its Wireless WAN module (not shown). The parameters that are necessary for initiating the CAPWAP session may be configured or downloaded from AC 320 during an initialization phase. A CAPWAP discovery request 301 is used for establishing an initial CAPWAP connection between mobile hotspot 370 and AC 320. CAPWAP discovery request messages may be sent by mobile hotspot 370 in the discover state after waiting for a random delay less than a max discovery interval, after mobile hotspot 370 first comes up or is initialized. This is to prevent an explosion of CAPWAP discovery request messages. If a CAPWAP discovery response message 302 is not received after sending the maximum number of CAPWAP discovery request messages, mobile hotspot 370 enters a sulking state and waits for an interval equal to a silent interval before sending further CAPWAP discovery request messages.

Upon receiving CAPWAP discovery request message 301, AC 320 responds with CAPWAP discovery response message 302 sent to the address in the source address of the received CAPWAP discovery request message. Once CAPWAP discovery response 302 is received, if the Wi-Fi management module of the wireless AP decides to establish a session with the responding AC 320, it may perform an MTU discovery to obtain information regarding the maximum supported packet size.

During authentication, a CAPWAP authentication request 303 is sent by Wi-Fi management module of mobile hotspot 370. Responsive thereto, a CAPWAP authentication response 304 is sent by AC 320. The authentication processing is used to setup a Datagram Transport Layer Security (DTLS) connection so that data packets between AC 320 and the wireless AP are encrypted and transmitted in a secure manner.

During join processing, a CAPWAP join request 305 is sent by the Wi-Fi management module of mobile hotspot 370 and a CAPWAP join response 306 is sent by AC 320 in step 306. The join processing is used by mobile hotspot 370 to request service from AC 320 after a DTLS connection is established with AC 320.

During configuration processing, a CAPWAP configuration request 307 is sent by the Wi-Fi management module of mobile hotspot 370 and a CAPWAP configuration response 308 is sent by AC 320. During the configuration processing, mobile hotspot 370 and AC 320 exchange configuration information through the already established CAPWAP tunnel. The configuration information may include, but is not limited to, one or more AC profiles that mobile hotspot 370 will use for establishing WiFi connections with WiFi clients (e.g., client 150). The AC profile retrieved from the AC may include an SSID and an authentication mechanism that will be used by mobile hotspot 370. Mobile hotspot 370 may broadcasts the SSID and then waits for a WiFi client to request to connect. When a WiFi client requests to connect to mobile hotspot 370, the WiFi client is required to authenticate itself according to the authentication mechanism defined in the AP profile. For example, the WiFi client may be required to go through a WPA2-Enterprise network type authentication. The WiFi client may be required to be authenticated by an AAA server, such as AAA server 160 of FIG. 1. If the WiFi client is authenticated, a WiFi connection may be established between mobile hotspot 370 and the WiFi client.

In step 309, CAPWAP data messages are transmitted between the Wi-Fi management module of the mobile hotspot and the AC and CAPWAP control messages are transmitted between the Wi-Fi management module of the mobile hotspot and the AC in step 310. For example, when an outgoing data packet from a Wi-Fi client is received by the Wi-Fi management module, it is transmitted to the AC as a data message through the CAPWAP data tunnel. Therefore, each WiFi clients that connected to the mobile hotspot may use the CAPWAP tunnel and transmit data packets securely through the Internet. Each of the WiFi clients that connect to the mobile hotspot will not need to set up a VPN connection on the WiFi client itself.

The operations shown in this embodiment is based on CAPWAP protocol and a CAPWAP tunnel is setup between the mobile hotspot and the AC. However, it is understood that the tunnel is used for establishing a connection between the mobile hotspot and the AC so that network conditions are hidden and data packets may be transferred in a safe manner.

Other protocols, such as Datagram Transport Layer Security (DTLS) or Secure Socket Layer (SSL), may also be used for setting up the tunnel.

Figure 4:
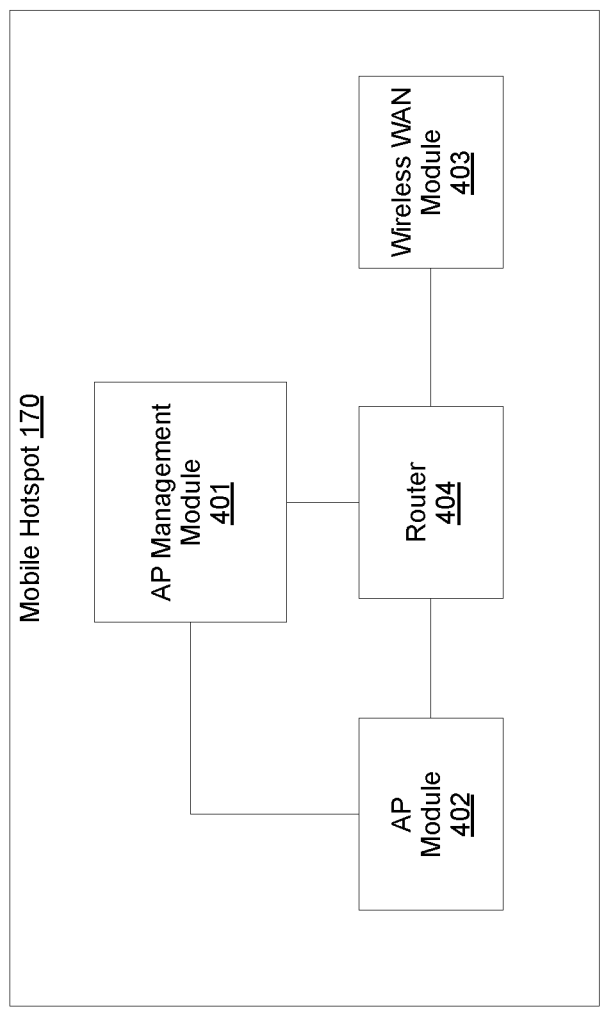
FIG. 4 illustrates exemplary internal components of a mobile hotspot in accordance with an embodiment of the present invention.

FIG. 4 illustrates exemplary internal components of mobile hotspot 170 of FIGS. 1 and 2 in accordance with an embodiment of the present invention. In the present example, mobile hotspot 170 may be a dedicated mobile hotspot or a mobile device with a hotspot function. Mobile hotspot 170 includes an AP management module 401, an AP module 402, a mobile WAN module 403 and a router 404.

AP module 402 includes hardware components and software components that are used for establishing WiFi connectivity with WiFi clients and transferring data packets to/from the WiFi clients based on a WLAN protocol, such as the Institute of Electrical and Electronics Engineers (IEEE) 802.11, 802.11a, 802.11b, 802.11g, 802.11ac, or etc. The hardware components may include a baseband processor and a radio frequency (RF) transceiver. The RF transceiver may provide, on a single semiconductor integrated circuit, a receiver circuit for each of a plurality of antennas and a transmit circuit for each of the plurality of antennas. Each receiver circuit down converts the RF signal detected by its associated antenna to a baseband signal and each transmit circuit up converts a baseband signal to be transmitted by an assigned antenna. The baseband processor is used for carrying out baseband processing on data received or to be sent by the RF transceiver. The baseband processor may be a chip that manages the radio functions of mobile hotspot 170. The software components may be used for providing Wi-Fi services to wireless clients and managing hardware associated with Wi-Fi communication of hardware platform, such as the baseband processor and RF transceiver. Wireless WAN module 403 includes hardware and software components that may be used for providing connectivity to a WAN, such as the Internet, through a wireless telecommunication data network. Router 404 is used for routing traffic received from WiFi clients or the WAN to an appropriate end.

AP management module 401 may be used for managing WLAN connectivity between AP module 402 and WiFi clients and security connectivity between AP module 402 and an AC.

In a configuration or initialization phase, mobile hotspot 170 may connect to an AC through a USB cable or other connections and register the mobile hotspot to the AC. Some parameters that are necessary for setting up a CAPWAP tunnel may be downloaded and configured from the AC. One or more enterprise AP profiles may also be downloaded and stored within mobile hotspot 170. AP management module 401 may also maintain a local AP profile that may be configured by the user of mobile hotspot 170. After mobile hotspot 170 is registered and initialized, mobile hotspot 170 may be managed by the AC and provide secure connectivity to its WiFi clients.

When mobile hotspot 170 is powered on and connected to the Internet through its wireless WAN module 403, AP management module 401 may determine if mobile hotspot 170 should be managed by an AC based on a physical switch or a configurable option that may be set by the user of mobile hotspot.

When the physical switch or the configurable option of mobile hotspot 170 is in a remote mode (meaning it is to be managed by an AC), AP management module 401 may establish a security tunnel, such as a CAPWAP tunnel, with the AC and one or more enterprise AP profiles and other configuration may be pushed from the AC through the security tunnel. AP module 402 may broadcast an SSID that is the same as that which is used within the enterprise network and authenticate a WiFi client based on an authentication mechanism that is also the same as that which is used within the enterprise network. When WiFi traffic is received from WiFi clients, AP management module 401 may encrypt the WiFi traffic and route the WiFi traffic through the security tunnel.

When the physical switch or the configurable option of mobile hotspot 170 is in a local mode (meaning it is not to be managed by an AC), the local AP profile may be used by AP module 402. AP module 402 may broadcast an SSID that is different from that which is used within the enterprise network and authenticate a WiFi client based on an authentication mechanism defined in the local AP profile. When traffic is received from WiFi clients, the traffic may be routed to the Internet without going through the security tunnel with the AC.

AP management module 401 may also enforce other security policies on the traffic sent from or to WiFi clients of mobile hotspot 170. For example, the mobile hotspot user may set up a rule to determine which of the one or more of AP profiles are to be used for establishing one or more wireless LAN connections for other WiFi client users. Other rules may be set up to allow multiple SSIDs to be broadcast by AP module 402 and authorized users may be connected to mobile hotspot 170 through one or more of the SSIDs. Network traffic from/to different users may be routed differently. For example, WiFi traffic from users connected to mobile hotspot 170 through a certain SSID may be encrypted and routed through the tunnel with the AC while WiFi traffic from other users may be routed to the Internet directly without going through the tunnel. In some embodiments, one or more forms of traffic inspections, such as anti-virus, data leak prevention (DLP) and etc. may also be implemented by AP management module 401.

Depending upon the particular implementation, mobile hotspot 170 may be integrated within a smart phone or other mobile device with personal hotspot functionality. An AP management application may be installed on the smart phone to allow the hotspot functionality to be locked. The AP management application may take over control of the WiFi chipset of the mobile device and provide secure access to a private network to WiFi clients that connect to the mobile device. When the hotspot function is started at the mobile device, the AP management application may retrieve AP profiles from an enterprise network AC and broadcast one or more SSIDs of an enterprise network. In this manner, the mobile device becomes an enterprise network grade AP and functionality like, SSID list, authentication method, IP network and security may be provided and controlled via the enterprise network AC.

Figure 5:
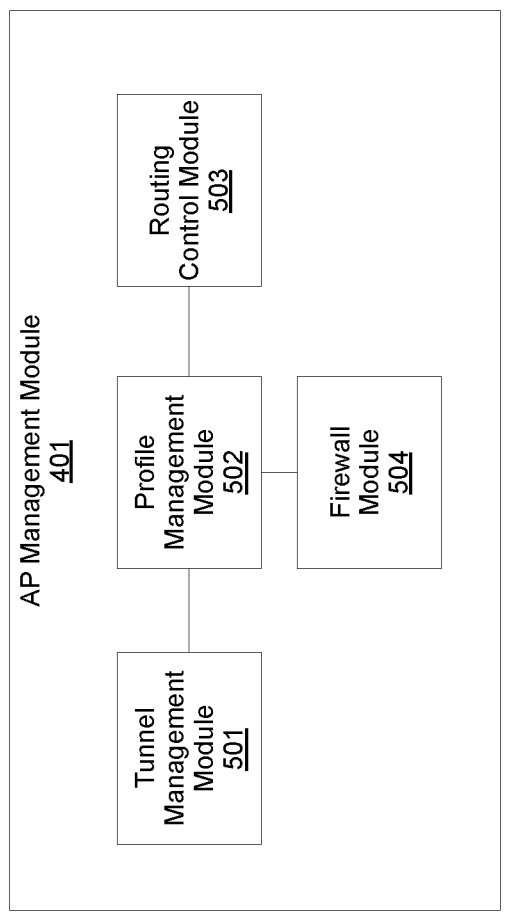
FIG. 5 illustrates exemplary internal components of an AP management module in accordance with an embodiment of the present invention.

FIG. 5 illustrates exemplary internal components of AP management module 401 of FIG. 4 in accordance with an embodiment of the present invention. In the present example, AP management module 401 includes a tunnel management module 501, a profile management module 502, a routing module 503 and a firewall module 504.

Tunnel management module 501 is used for managing a tunnel between the mobile hotspot and an enterprise network AC. After the mobile hotspot is registered with the enterprise network AC during the initialization procedure, for example, parameters that are needed for establishing the tunnel re set and stored within the tunnel management module 501. When the mobile hotspot connects to the Internet through the telecommunication data network and the mobile hotspot is in a remote mode, tunnel management module 501 establishes a tunnel, such as a CAPWAP tunnel with the AC. One or more enterprise AP profiles and other configurations may be pushed to the mobile hotspot by the AC through the tunnel. During operation, WiFi traffic received from WiFi clients of the mobile hotspot are transmitted to the AC through the tunnel by tunnel management module 501. If the tunnel is a secure tunnel, WiFi traffic is encrypted before transmission.

Profile management module 502 is used for managing AP profiles that are used by the mobile hotspot. In the present example, multiple AP profiles may be used by the mobile hotspot. One or more enterprise AP profile may be retrieved by the profile management module 502 from an enterprise network AC during the initialization procedure or after a control tunnel is established with the AC. One or more local AP profiles may also be configured by the user of the mobile hotspot. The enterprise AP profiles are used by all APs within the enterprise network that are managed by the AC and by the mobile hotspot. A user of the enterprise network may access the network through APs when within range of the APs and by way of the mobile hotspot in the same manner when outside of the range of the APs. The WiFi user may use the same SSID and authentication mechanism to connect to APs and the mobile hotspot. In some examples, AP management module 501 may support roaming between APs within the enterprise network and the mobile hotspot through pre-authentication and pairwise master key (PMK) caching.

AP management module 502 may determine which one or more AP profiles are used by the mobile hotspot. When the mobile hotspot is operating in a remote mode, profile management module 502 may use an enterprise AP profile and the enterprise network SSID may be broadcasted by the mobile hotspot. When the mobile hotspot is operating in a local mode, profile management module 502 may use a local AP profile and an SSID set by the user is broadcasted. It will be apparent to those skilled in the art that multiple SSIDs may be defined in a single AP profile and may be broadcasted simultaneously. WiFi clients within the coverage area of the mobile hotspot may then select any one of the SSIDs.

When WiFi clients connect to the mobile hotspot through different SSIDs, different routing and/or security policies may be implemented. For example, when WiFi clients are connected to the mobile hotspot through an enterprise network SSID, routing module 503 may determine that traffic from the WiFi clients is to be routed through a secure tunnel, for example, between the mobile hotspot and the AC. When WiFi clients are connected to the mobile hotspot through a local SSID, routing module 503 may determine that traffic from such WiFi clients is to be routed to the Internet without going through the tunnel.

Firewall module 504 is used for enforcing security rules that control the traffic from/to the WiFi clients. Firewall module 504 may inspect the traffic for viruses, data leakage or other malicious content/applications before the traffic is routed to its destination. An action may be taken if the inspection of the traffic fails. The firewall functions are well known in the art and further description thereof is omitted for brevity.

Figure 6:
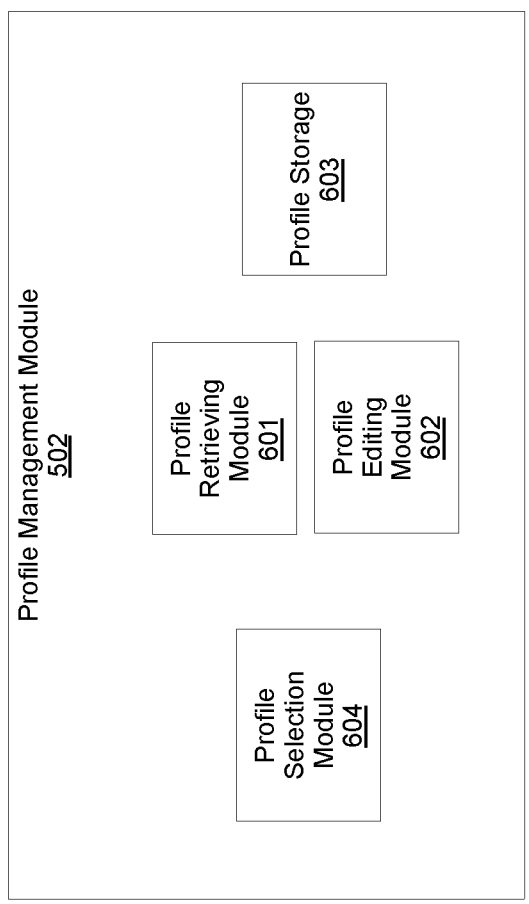
FIG. 6 illustrates exemplary internal components of a profile management module in accordance with an embodiment of the present invention.

FIG. 6 illustrates exemplary internal components of profile management module 502 of FIG. 5 in accordance with an embodiment of the present invention. In the present example, profile management module 502 includes a profile retrieving module 601, a profile editing module 602, a profile storage 603 and a profile selection module 604. Profile retrieving module 601 is used for retrieving one or more AP profiles from an enterprise AC during an initialization procedure or after a tunnel is established with the AC. The AP profiles retrieved from the AC may be the same as that used by APs within the private network that are managed by the AC. Profile retrieving module 601 may also implement pre-authentication and PMK caching with an AAA server of the private network so that WiFi client of the private network may roam between and among APs within the private network and the mobile hotspot.

Profile editing module 602 is used for generating and editing one or more local AP profiles so that the mobile hotspot may work independently of the AC and traffic of the mobile hotspot may be routed to the Internet directly without going through the AC. The user of the mobile hotspot may create one or more local AP profiles in which SSIDs and authentication mechanisms that are different from that of the private network are defined. The AP profiles, including enterprise AP profiles and local AP profiles may be stored within profile storage 603. Profile selection module 604 may select one or more AP profiles from profile storage 603 based on the mode (e.g., local mode or remote mode) of the mobile hotspot that is set by the user. The mobile hotspot may broadcast the SSIDs and authenticate WiFi users based on the AP profiles selected by profile selection module 604. A tunnel may also be established if an enterprise AP profile is selected.

Figure 7:
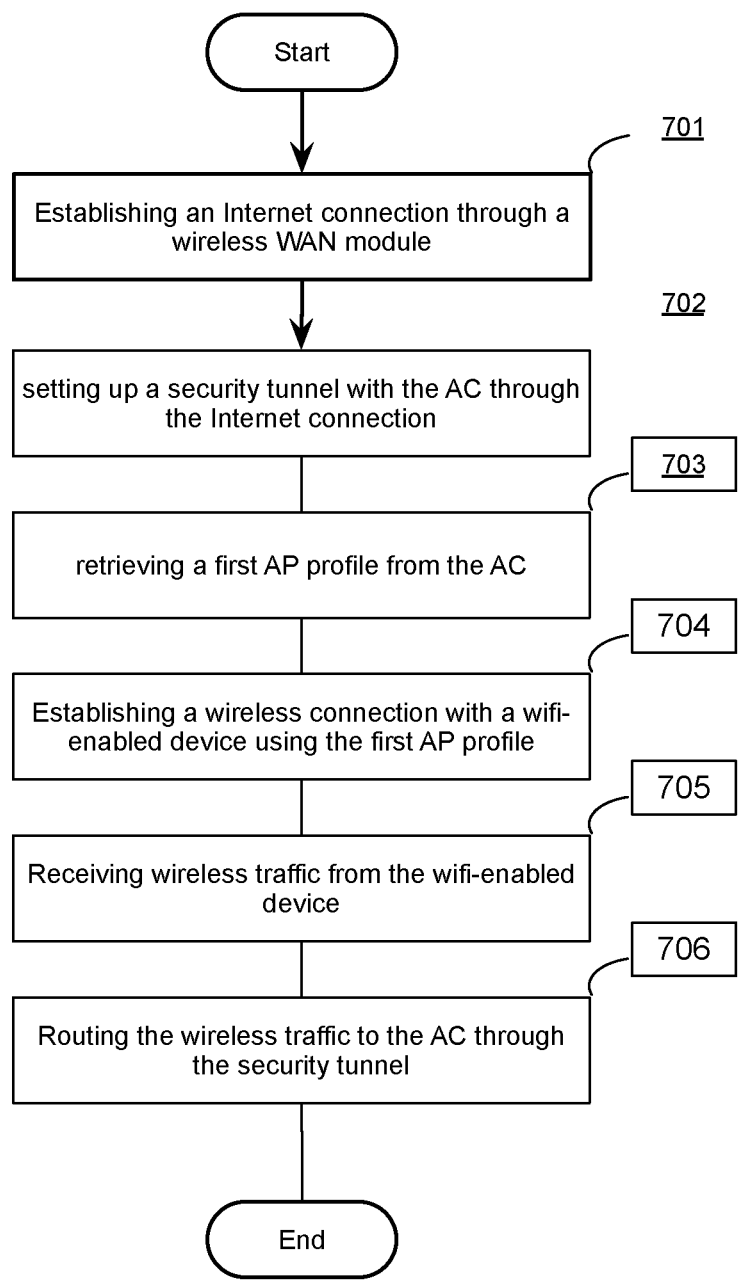
FIG. 7 is a flow diagram illustrating mobile hotspot management when a dedicated security connection exists with a private network in accordance with an embodiment of the present invention.

FIG. 7 is a flow diagram illustrating management of a mobile hotspot with a dedicated security connection to a private network in accordance with an embodiment of the present invention. In the context of the present example, operation of a mobile hotspot in an exemplary remote mode is illustrated. A tunnel with an enterprise AC may be established whenever the mobile hotspot connects to the Internet and traffic from WiFi clients that connect to the mobile spot are always routed to the tunnel.

At block 701, WWAN connection is established by a wireless WAN module of a mobile hotspot. The mobile hotspot connects to the Internet through a telecommunication data network, such as a 3G/4G cellular network.

At block 702, the mobile hotspot sets up a tunnel, such as a CAPWAP tunnel, with an enterprise AC on through the Internet connection. The parameters necessary for setting up the tunnel may be configured and stored at the mobile hotspot after it is registered with the AC.

At block 703, the mobile hotspot may retrieve an enterprise AP profile from the AC. For example, configuration management and device management messages may be exchanged between the mobile hotspot and the enterprise AC through a control tunnel based on CAPWAP protocol. After the control tunnel is established between the mobile hotspot and the AC, the AC may push configurations, including an enterprise AP profile to the mobile hotspot.

At block 704, the mobile hotspot may broadcast a SSID defined in the enterprise AP profile pushed from the AC and authenticate a WiFi user based on the authentication mechanism of the enterprise AP profile. A WiFi connection may be established if the WiFi user is authenticated.

The mobile hotspot receives WiFi traffic from WiFi clients at block 705 and routes the WiFi traffic to the AC through the tunnel at block 706. The WiFi traffic may be encrypted and transmitted through a data tunnel as data messages. By using the tunnel established between the mobile hotspot and the enterprise AC, WiFi clients connected to the mobile hotspot do not need to run a VPN application to access the enterprise network. The tunnel connecting to the enterprise network may be shared by multiple WiFi clients.

Figure 8:
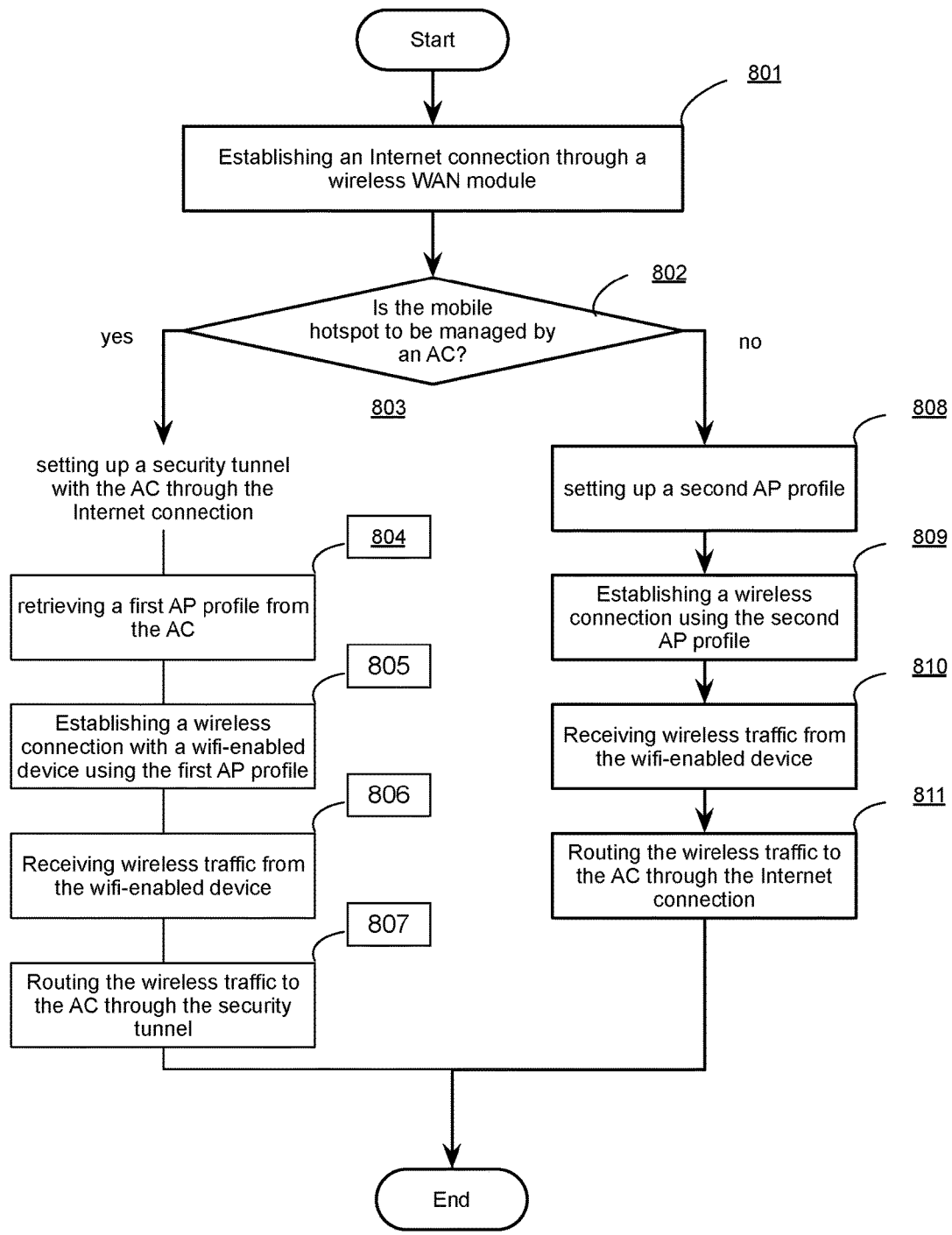
FIG. 8 is a flow diagram illustrating mobile hotspot management when multiple AP profiles exist in accordance with an embodiment of the present invention.

FIG. 8 is a flow diagram illustrating a method for managing a mobile hotspot with multiple AP profiles in accordance with an embodiment of the present invention. In the present example, the mobile hotspot can work in two modes, i.e. remote mode and local mode. The mobile hotspot user may select the mode by a physical switch or a software option. In the remote mode, the mobile hotspot establishes a tunnel with an enterprise AC and is managed by the AC. The WiFi clients connecting to the mobile hotspot may access the enterprise network through the tunnel. In the local mode, the mobile hotspot works individually from the private network and traffic from WiFi clients are routed to the Internet directly.

At block 801, an Internet connection is established by a wireless WAN module of a mobile hotspot. The mobile hotspot connects to the Internet through a telecommunication data network, such as a 3G/4G cellular network.

At block 802, the mobile hotspot determines which mode is set by the user. If the mobile hotspot is in the remote mode and it is to be managed by an enterprise AC, the mobile hotspot sets up a tunnel, such as a CAPWAP tunnel, with the AC through the Internet connection at block 803.

At block 804, the mobile hotspot may retrieve a first AP profile from the AC. For example, configuration management and device management messages may be exchanged between an AP and an AC through a control tunnel based on CAPWAP protocol. When the tunnel is established between the mobile hotspot and the AC, the AC may push configurations, including a first AP profile to the mobile hotspot. The first AP profile may be used by all APs within the enterprise network and the mobile hotspot.

At block 805, the mobile hotspot may broadcast a SSID defined in the first AP profile pushed from the AC and authenticate a WiFi user based on the authentication mechanism of the first AP profile. A WiFi connection may be established if the WiFi user is authenticated.

The mobile hotspot receives WiFi traffic from WiFi clients at block 806 and routes the WiFi traffic to the AC through the tunnel at block 807. By using the tunnel established between the mobile hotspot and the enterprise AC, WiFi clients that connect to the mobile hotspot do not need to run a VPN application to access the enterprise network. The tunnel connecting to the enterprise network may be shared by multiple WiFi clients.

Now, refer back to block 802. If the mobile hotspot is in local mode and does not need to be managed by the AC, the procedure goes to block 808, where a second AP profile is used for managing the mobile hotspot. The second AP profile may be configured and stored locally at the mobile hotspot by a mobile hotspot user. The SSID and authentication mechanism defined in the second AP profile may be different from ones that are used by the private network.

At block 809, the mobile hotspot may broadcast a SSID defined in the second AP profile and authenticate a WiFi user based on the authentication mechanism of the second AP profile. A WiFi connection may be established after the WiFi user is authenticated.

Then, the mobile hotspot receives WiFi traffic from the WiFi client at block 810 and routes the WiFi traffic to the Internet without going through the tunnel at block 811. In the local mode, a WiFi client does not need to access the enterprise network and the WiFi client may access the Internet directly.

Figure 9:
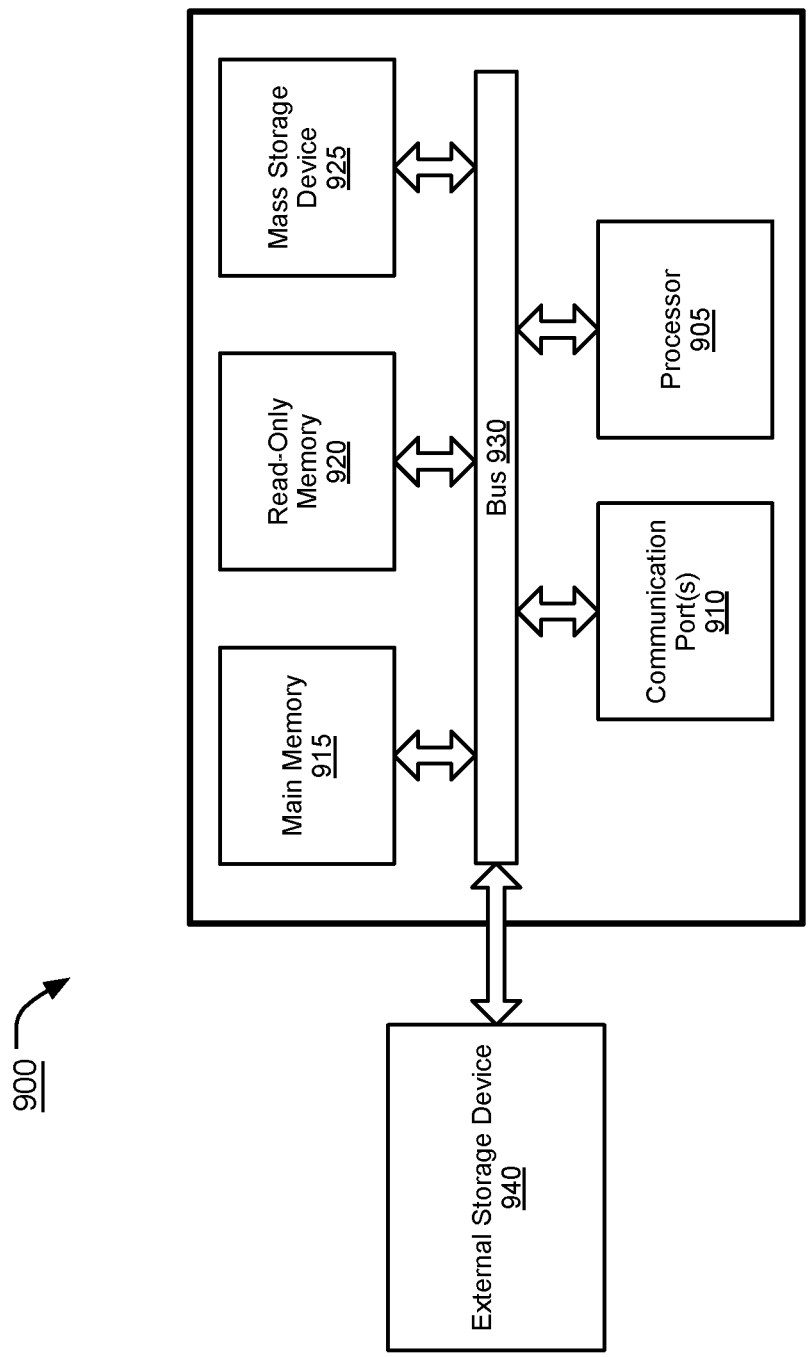
FIG. 9 is an exemplary computer system in which or with which embodiments of the present invention may be utilized.

FIG. 9 is an example of a computer system 900 with which embodiments of the present disclosure may be utilized. Computer system 900 may represent or form a part of a network appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 900 includes a bus 930, a processor 905, communication port 910, a main memory 915, a removable storage media 940, a read only memory 920 and a mass storage 925. A person skilled in the art will appreciate that computer system 900 may include more than one processor and communication ports.

Examples of processor 905 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 905 may include various modules associated with embodiments of the present invention.

Communication port 910 can be any of an RS-232 port for use with a modem based dialup connection, a 10/100 Ethernet port, a Gigabit or 10 Gigabit port using copper or fiber, a serial port, a parallel port, or other existing or future ports. Communication port 910 may be chosen depending on a network, such a Local Area Network (LAN), Wide Area Network (WAN), or any network to which computer system 900 connects.

Memory 915 can be Random Access Memory (RAM), or any other dynamic storage device commonly known in the art. Read only memory 920 can be any static storage device(s) such as, but not limited to, a Programmable Read Only Memory (PROM) chips for storing static information such as start-up or BIOS instructions for processor 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 930 communicatively couples processor(s) 905 with the other memory, storage and communication blocks. Bus 930 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 905 to system memory.

Optionally, operator and administrative interfaces, such as a display, keyboard, and a cursor control device, may also be coupled to bus 930 to support direct operator interaction with computer system 900. Other operator and administrative interfaces can be provided through network connections connected through communication port 910.

Removable storage media 940 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    establishing, by a mobile hotspot, a wide area network (WAN) connection through a telecommunication data network via a wireless WAN module of the mobile hotspot;
    when the mobile hotspot is in a remote mode in which the mobile hotspot is to be managed by an access controller (AC) of an enterprise that manages a plurality of access points (APs) of a wireless network of the enterprise;
        setting up through the WAN connection, by the mobile hotspot, a secure tunnel with the AC;
        broadcasting, by the mobile hotspot, a first service set identifier (SSID) that is also broadcast within premises of the enterprise by a plurality of access points (APs) associated with a wireless network of the enterprise that are managed by the AC;
        establishing, by the mobile hotspot, a wireless local area network (WLAN) connection with a Wireless Fidelity (WiFi)-enabled device within range of the mobile hotspot based on an enterprise AP profile containing (i) authentication information for authenticating one or more WiFi users that are approved to access the wireless network and (ii) information identifying the first SSID;
        receiving, by the mobile hotspot, WLAN traffic from the WiFi-enabled device through the WLAN connection; and
        causing to be transmitted, by the mobile hotspot, the WLAN traffic to a server of the enterprise via the secure tunnel and the AC; and
    when the mobile hotspot is in a local mode in which the mobile hotspot is not to be managed by the AC:
        broadcasting, by the mobile hotspot, a second SSID that is distinct from the first SSID;
        establishing, by the mobile hotspot, the WLAN connection with the WiFi-enabled device based on a second AP profile;
        receiving, by the mobile hotspot, WLAN traffic from the WiFi-enabled device through the WLAN connection; and
        transmitting, by the mobile hotspot, the WLAN traffic to a server external to the enterprise.

2. The method of claim 1, further comprising after the secure tunnel is set up, receiving, by the mobile hotspot, the enterprise AP profile from the AC.

3. The method of claim 1, further comprising responsive to initialization of the mobile hotspot, retrieving, by the mobile hotspot, the enterprise AP profile from the AC.

4. The method of claim 1, further comprising responsive to initialization of the mobile hotspot, locally generating, by the mobile hotspot, the enterprise AP profile.

5. The method of claim 1, wherein the enterprise AP profile contains information identifying a plurality of SSIDs and the plurality of SSIDs are used for establishing multiple WLAN connections simultaneously.

6. The method of claim 5, wherein the mobile hotspot further comprises at least one security policy and wherein the method further comprises controlling, by the mobile hotspot, traffic from or to the WiFi-enabled device based on the at least one security policy.

7. The method of claim 6, wherein the at least one security policy is used by the mobile hotspot in connection with one or more of:
    determining which of multiple AP profiles are to be used for establishing one or more WLAN connections;
    determining routing of traffic from the WiFi-enabled device; and
    determining one or more inspection actions that will be performed by the mobile hotspot on the WLAN traffic.

8. The method of claim 1, wherein the mobile hotspot comprises a dedicated mobile hotspot or a mobile device with a personal hotspot.

9. A non-transitory computer-readable storage medium embodying a set of instructions, which when executed by one or more processors of a mobile hotspot, cause the one or more processors to perform a method comprising:
    establishing a wide area network (WAN) connection through a telecommunication data network via a wireless WAN module of the mobile hotspot;
    when the mobile hotspot is in a remote mode in which the mobile hotspot is to be managed by an access controller (AC) of an enterprise that manages a plurality of access points (APs) of a wireless network of the enterprise;
        setting up through the WAN connection a secure tunnel with the AC;
        broadcasting a first service set identifier (SSID) that is also broadcast within premises of the enterprise by a plurality of access points (APs) associated with a wireless network of the enterprise that are managed by the AC;
        establishing a wireless local area network (WLAN) connection with a Wireless Fidelity (WiFi)-enabled device within range of the mobile hotspot based on an enterprise AP profile containing (i) authentication information for authenticating one or more WiFi users that are approved to access the wireless network and (ii) information identifying the first SSID;
        receiving WLAN traffic from the WiFi-enabled device through the WLAN connection; and
        causing to be transmitted the WLAN traffic to a server of the enterprise via the secure tunnel and the AC; and
    when the mobile hotspot is in a local mode in which the mobile hotspot is not to be managed by the AC:
        broadcasting a second SSID that is distinct from the first SSID;
        establishing the WLAN connection with the WiFi-enabled device based on a second AP profile;
        receiving WLAN traffic from the WiFi-enabled device through the WLAN connection; and
        transmitting the WLAN traffic to a server external to the enterprise.

10. The non-transitory computer-readable storage medium of claim 9, wherein the method further comprises after the secure tunnel is set up, receiving the enterprise AP profile from the AC.

11. The non-transitory computer-readable storage medium of claim 9, wherein the method further comprises responsive to initialization of the mobile hotspot, retrieving the enterprise AP profile from the AC.

12. The non-transitory computer-readable storage medium of claim 9, wherein the method further comprises responsive to initialization of the mobile hotspot, locally generating the enterprise AP profile.

13. The non-transitory computer-readable storage medium of claim 9, wherein the enterprise AP profile contains information identifying a plurality of SSIDs and the plurality of SSIDs are used for establishing multiple WLAN connections simultaneously.

14. The non-transitory computer-readable storage medium of claim 13, wherein the mobile hotspot further comprises at least one security policy and wherein the method further comprises controlling traffic from or to the WiFi-enabled device based on the at least one security policy.

15. The non-transitory computer-readable storage medium of claim 14, wherein the at least one security policy is used by the mobile hotspot in connection with one or more of:
   determining which of multiple AP profiles are to be used for establishing one or more WLAN connections;
   determining routing of traffic from the WiFi-enabled device; and
   determining one or more inspection actions that will be performed by the mobile hotspot on the WLAN traffic.

16. The non-transitory computer-readable storage medium of claim 9, wherein the mobile hotspot comprises a dedicated mobile hotspot or a mobile device with a personal hotspot.

* * * * *